US012713199B2

(12) United States Patent
Enomoto et al.

(10) Patent No.: US 12,713,199 B2
(45) Date of Patent: Aug. 18, 2026

(54) SOUND SIGNAL PROCESSING DEVICE, SOUND SIGNAL PROCESSING METHOD, AND RECORDING MEDIUM

(71) Applicant: Panasonic Intellectual Property Corporation of America, Torrance, CA (US)

(72) Inventors: Seigo Enomoto, Kyoto (JP); Hikaru Usami, Osaka (JP); Kota Nakahashi, Osaka (JP); Hiroyuki Ehara, Kanagawa (JP); Mariko Yamada, Hyogo (JP); Tomokazu Ishikawa, Osaka (JP); Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 138 days.

(21) Appl. No.: 18/892,983

(22) Filed: Sep. 23, 2024

(65) Prior Publication Data

US 2025/0024221 A1 Jan. 16, 2025

Related U.S. Application Data

(63) Continuation of application No. PCT/JP2023/014067, filed on Apr. 5, 2023.

(Continued)

(30) Foreign Application Priority Data

Jul. 29, 2022 (JP) ................................ 2022-121837

(51) Int. Cl.
*H04S 7/00* (2006.01)

(52) U.S. Cl.
CPC .......... *H04S 7/304* (2013.01); *H04S 2400/11* (2013.01)

(58) Field of Classification Search
CPC ............................ H04S 7/304; H04S 2400/11
See application file for complete search history.

(56) References Cited

U.S. PATENT DOCUMENTS

2025/0350903 A1* 11/2025 De Bruijn .............. H04S 7/305

FOREIGN PATENT DOCUMENTS

JP 2005-295416 10/2005

OTHER PUBLICATIONS

International Search Report (ISR) issued on Jun. 27, 2023 in International (PCT) Application No. PCT/JP2023/014067.

* cited by examiner

*Primary Examiner* — Andrew Sniezek
(74) *Attorney, Agent, or Firm* — Wenderoth, Lind & Ponack, L.L.P.

(57) ABSTRACT

Each of one or more audio objects includes: sound data of a sound emitted from an object that corresponds to the audio object; and metadata that includes position information indicating a position of the object in a virtual sound space. A sound signal processing device includes: a selector that selects an audio object as a conversion target from among the one or more audio objects; and an fluctuation imparter that converts the audio object selected as the conversion target to impart, to the audio object selected, a fluctuation effect of fluctuating a sound emitted from an object that corresponds to the audio object converted when the sound signal is reproduced. The selector does not select an audio object that corresponds to an object whose position is moving in the virtual sound space based on a transition over time of the position information included in the metadata.

5 Claims, 4 Drawing Sheets

Related U.S. Application Data

(60) Provisional application No. 63/330,917, filed on Apr. 14, 2022.

SOUND SIGNAL PROCESSING DEVICE, SOUND SIGNAL PROCESSING METHOD, AND RECORDING MEDIUM

CROSS REFERENCE TO RELATED APPLICATIONS

This is a continuation application of PCT International Application No. PCT/JP2023/014067 filed on Apr. 5, 2023, designating the United States of America, which is based on and claims priority of U.S. Provisional Patent Application No. 63/330,917 filed on Apr. 14, 2022, and Japanese Patent Application No. 2022-121837 filed on Jul. 29, 2022. The entire disclosures of the above-identified applications, including the specifications, drawings and claims are incorporated herein by reference in their entirety.

FIELD

The present disclosure relates a sound signal processing device, a sound signal processing method, and a recording medium.

BACKGROUND

In recent years, technical development for virtual experience from the view of a user such as virtual reality (VR) and augmented reality (AR) is underway. With VR and AR, users can feel as if they are present (or in other words, immersed) in a virtual space. In particular, the sense of immersion is improved by combining three-dimensional visual experience and three-dimensional auditory experience, and thus, n VR and AR, techniques for three-dimensional auditory experience are also regarded as important. Under the circumstance described above, a standard called MPEG-I is under development as the standard for reproducing three-dimensional sounds in virtual spaces such as a VR virtual space and an AR virtual space.

The standardization of MPEG-I is underway to expand the conventional standard for degrees of freedom of rotation about three axes that are orthogonal at a listening point (3DoF) and add degrees of freedom of movement of the listening point in directions that extend along the three axes (i.e. implement 6DoF). That is, the user can move in a virtual sound space and hear sounds emitted from objects located in the virtual sound space from various listening points.

On the other hand, a sound signal processing device is under development in which a fluctuation effect is imparted to a sound emitted from an object located in a virtual sound space to increase the sense of realism of the object (Patent Literature (PTL) 1).

More specifically, PTL 1 discloses a three-dimensional sound processing device as an example of a sound signal processing device, wherein, in order to provide a three-dimensional sense of localization to an object located in a virtual sound space (cause the user to perceive the position of the object in the virtual sound space) to cause the user to notice the localization of the object (a sound stimulation stimulates human's consciousness), three-dimensional sound processing is performed by shifting the localization of a sound image within the virtual sound space in which the object is localized to cause very small changes in the sense of localization, thereby, causing the user to easily notice the three-dimensional localization of the object. This processing is based on the finding that human's auditory function filters a change in the sound stimulation by the action of FM neuron or the like, and only the change reaches the cerebral cortex, and thus, in order to cause the human to notice the sound stimulation, it is effective to apply non-constant stimulation that is constantly changing.

CITATION LIST

Patent Literature

PTL 1: Japanese Unexamined Patent Application Publication No. 2005-295416

SUMMARY

Technical Problem

However, with the three-dimensional sound processing disclosed in PTL 1 described above, there are cases where appropriate processing is not performed.

In view of the above, it is an object of the present disclosure to provide a sound signal processing device and the like that can cause the user to more appropriately perceive a three-dimensional sound.

Solution to Problem

A sound signal processing device according to an aspect of the present disclosure is a sound signal processing device that converts input data to a sound signal, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes position information indicating a position in the virtual sound space of the object that corresponds to the audio object, the sound signal processing device includes: a selector that selects an audio object as a conversion target from among the one or more audio objects; and a fluctuation imparter that converts the audio object selected as the conversion target to impart, to the audio object selected, a fluctuation effect of fluctuating a sound emitted from an object among the one or more objects that corresponds to the audio object converted when the sound signal is reproduced, and the selector does not select, as the conversion target, an audio object that corresponds to an object whose position is moving in the virtual sound space, the object being one of the one or more objects, based on a transition over time of the position information included in the metadata.

Also, a sound signal processing method according to an aspect of the present disclosure is a sound signal processing method for converting input data to a sound signal executed by a computer, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes position information indicating a position in the virtual sound space of the object that corresponds to the audio object, the sound signal processing method includes: selecting an audio object as a conversion target from among the one or more audio objects; and converting the audio object selected as the conversion target to impart, to the audio object selected, a fluctuation effect of fluctuating a sound emitted from an object among the one or more objects that corresponds to the audio object converted when the sound signal is reproduced, and the selecting of the audio object as the conversion target includes not selecting, as the conversion target, an audio object that corresponds to an object whose position is moving in the virtual sound space, the object being one of the one or more objects, based on a transition over time of the position information included in the metadata.

Also, an aspect of the present disclosure can also be implemented as a non-transitory computer-readable recording medium having recorded thereon a program for causing a computer to execute the sound processing method described above.

General and specific aspects disclosed above may be implemented using a system, a device, a method, an integrated circuit, a computer program, or a computer-readable non-transitory recording medium such as a CD-ROM, or any combination of systems, devices, methods, integrated circuits, computer programs, or computer-readable recording media.

Advantageous Effects

According to the present disclosure, it is possible to cause the user to more appropriately perceive a three-dimensional sound.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
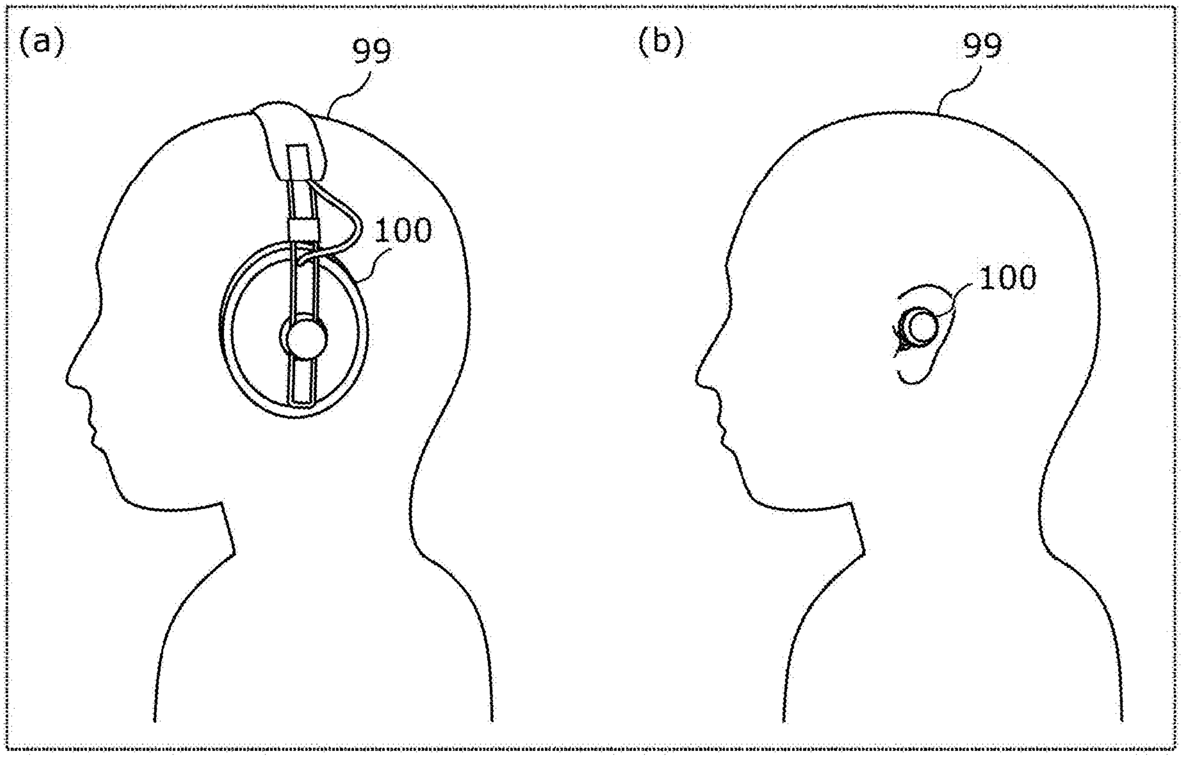
FIG. 1 is a schematic diagram showing an example of the use of a sound signal reproduction device according to Embodiment 1.

Underlying Knowledge Forming Basis of the Present Disclosure

As described in the background art section, development of a sound signal processing device, wherein a fluctuation effect is imparted to a sound emitted from an object in a virtual sound space to increase the sense of realism of the object, is underway.

On the other hand, in order to impart a fluctuation effect to an object that is located in a virtual sound space, it is necessary to perform different processing operations on the sound emitted from the object over time. Because various types of objects are located in a virtual sound space that can be created by VR or AR, if a fluctuation effect is imparted to each object, a huge amount of processing is required.

In particular, in a sound space in which 6DoF, which is assumed in MPEG-I, can be implemented, appropriate convolution processing of head-related transfer functions that vary over time is required based on a relationship such as a relative position between each object and user's listening point that varies over time. Accordingly, if the computation processing for imparting the fluctuation effect described above is performed in addition to the convolution processing, processing resources (also referred to as "computation resources") are also required to be further expanded proportionately, which may be a barrier to the widespread use of VR and AR.

Here, not all objects' sense of realism in the virtual sound space is increased by imparting the fluctuation effect. This applies when the fluctuation effect is imparted to, for example, an object that is moving by itself (a moving body such as an automobile or an airplane, or a flying object such as a hit ball or a bullet), an object that is rotating by itself (a rotating body such as a spinning top or a fan), or an object that emits an omnidirectional sound (a wind chime or the like).

Furthermore, when the fluctuation effect is imparted to an object that does not move by itself (an object that does not belong to an animate object, or in other words, an inanimate object, or the like), the sound is actually perceived unnaturally, which may cause the user to feel uncomfortable. The same applies when the fluctuation effect is imparted to an object that is generally recognized as not being capable of moving (an object that is not a moving body such as a wall clock or a volcano, or in other words, a non-moving body).

In view of the above, with the sound signal processing device and the like of the present disclosure, it is an object of the present disclosure to provide a sound signal processing device and the like, wherein, by selectively separating various types of objects in a virtual sound space into an object to which the fluctuation effect is to be imparted (conversion target) and an object to which the fluctuation effect is not to be imparted (non-conversion target) to distinguish therebetween, the sense of realism and the sense of localization of only necessary objects can be improved, while objects that have little benefit from imparting the fluctuation effect are not processed to suppress expansion of the processing resources, thereby causing the user to more appropriately perceive a three-dimensional sound in terms of processing efficiency.

Summary of Disclosure

A summary of the present disclosure is as follows.

A sound signal processing device according to a first aspect of the present disclosure is a sound signal processing device that converts input data to a sound signal, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes position information indicating a position in the virtual sound space of the object that corresponds to the audio object, the sound signal processing device includes: a selector that selects an audio object as a conversion target from among the one or more audio objects; and a fluctuation imparter that converts the audio object selected as the conversion target to impart, to the audio object selected, a fluctuation effect of fluctuating a sound emitted from an object among the one or more objects that corresponds to the audio object converted when the sound signal is reproduced, and the selector does not select, as the conversion target, an audio object that corresponds to an object whose position is moving in the virtual sound space, the object being one of the one or more objects, based on a transition over time of the position information included in the metadata.

With the sound signal processing device described above, it is possible to prevent an audio object that corresponds to an object whose position is moving in the virtual sound space from being selected as a conversion target based on the transition over time of the position information included in the metadata. With an object whose position is moving in the virtual sound space, even when the fluctuation effect of fluctuating the sound is imparted to the object, the advantageous effect of improving the sense of realism and the sense of localization produced by the fluctuation effect may not be sufficiently obtained, which may not be worth using processing resources used to impart the fluctuation effect. Accordingly, by preventing an audio object that corresponds to an object whose position is moving in the virtual sound space from being selected, it is possible to reduce the possibility of wasting processing resources. In the manner as described above, as a result of the selector that selects an audio object as a conversion target from among the one or more audio objects selectively separating various types of objects located in the virtual sound space into an object to which the fluctuation effect is to be imparted (conversion target) and an object to which the fluctuation effect is not to be imparted (non-conversion target) to distinguish therebetween based on at least one of the displacement of the object, the rotation of the object, and the directivity of emitting sound, the sense of realism and the sense of localization of only necessary objects can be improved, while objects that have little benefit from imparting the fluctuation effect are not processed to suppress expansion of the processing resources, thereby causing the user to more appropriately perceive a three-dimensional sound in terms of processing efficiency.

Also, a sound signal processing device according to a second aspect of the present disclosure is a sound signal processing device that converts input data to a sound signal, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes orientation information indicating an orientation in the virtual sound space of the object that corresponds to the audio object, the sound signal processing device includes: a selector that selects an audio object as a conversion target from among the one or more audio objects; and a fluctuation imparter that converts the audio object selected as the conversion target to impart, to the audio object selected, a fluctuation effect of fluctuating a sound emitted from an object among the one or more objects that corresponds to the audio object converted when the sound signal is reproduced, and the selector does not select, as the conversion target, an audio object that corresponds to an object that is rotating in the virtual sound space, the object being one of the one or more objects, based on a transition over time of the orientation information included in the metadata.

With the sound signal processing device described above, it is possible to prevent an audio object that corresponds to an object that is rotating in the virtual sound space from being selected as a conversion target based on the transition over time of the orientation information included in the metadata. With an object that is rotating in the virtual sound space, even when the fluctuation effect of fluctuating the sound is imparted to the object, the advantageous effect of improving the sense of realism and the sense of localization produced by the fluctuation effect may not be sufficiently obtained, which may not be worth using processing resources used to impart the fluctuation effect. Accordingly, by preventing an audio object that corresponds to an object that is rotating in the virtual sound space from being selected, it is possible to reduce the possibility of wasting processing resources. In the manner as described above, as a result of the selector that selects an audio object as a conversion target from among the one or more audio objects selectively separating various types of objects located in the virtual sound space into an object to which the fluctuation effect is to be imparted (conversion target) and an object to which the fluctuation effect is not to be imparted (non-conversion target) to distinguish therebetween based on at least one of the displacement of the object, the rotation of the object, and the directivity of emitting sound, the sense of realism and the sense of localization of only necessary objects can be improved, while objects that have little benefit from imparting the fluctuation effect are not processed to suppress expansion of the processing resources, thereby causing the user to more appropriately perceive a three-dimensional sound in terms of processing efficiency.

Also, a sound signal processing device according to a third aspect of the present disclosure is a sound signal processing device that converts input data to a sound signal, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes directivity information indicating a directivity of the sound emitted from the object that corresponds to the audio object, the sound signal processing device includes: a selector that selects an audio object as a conversion target from among the one or more audio objects; and a fluctuation imparter that converts the audio object selected as the conversion target to impart, to the audio object selected, a fluctuation effect of fluctuating a sound emitted from an object among the one or more objects that corresponds to the audio object converted when the sound signal is reproduced, and the selector does not select, as the conversion target, an audio object that corresponds to an object whose emitting sound is omnidirectional, the object being one of the one or more objects, based on the directivity information included in the metadata.

With the sound signal processing device described above, it is possible to prevent an audio object that corresponds to an object whose emitting sound is omnidirectional from being selected as a conversion target based on the transition over time of the directivity information included in the metadata. With an object whose emitting sound is omnidirectional, even when the fluctuation effect of fluctuating the sound is imparted to the object, the advantageous effect of improving the sense of realism and the sense of localization produced by the fluctuation effect may not be sufficiently obtained, which may not be worth using processing resources used to impart the fluctuation effect. Accordingly, by preventing an audio object that corresponds to an object whose emitting sound is omnidirectional from being selected, it is possible to reduce the possibility of wasting processing resources. In the manner as described above, as a result of the selector that selects an audio object as a conversion target from among the one or more audio objects selectively separating various types of objects located in the virtual sound space into an object to which the fluctuation effect is to be imparted (conversion target) and an object to which the fluctuation effect is not to be imparted (non-conversion target) to distinguish therebetween based on at least one of the displacement of the object, the rotation of the object, and the directivity of emitting sound, the sense of realism and the sense of localization of only necessary objects can be improved, while objects that have little benefit from imparting the fluctuation effect are not processed to suppress expansion of the processing resources, thereby causing the user to more appropriately perceive a three-dimensional sound in terms of processing efficiency.

Also, a sound signal processing device according to a fourth aspect of the present disclosure is the sound signal processing device according to any one of the first to third aspects, wherein the metadata further includes an animate flag that indicates whether the object that corresponds to the audio object belongs to an animate object, and the selector does not select an audio object whose animate flag indicates that the object that corresponds to the audio object does not belong to the animate object.

With the sound signal processing device described above, depending on how the animate flag included in the metadata is set (to, for example, which numerical value), whether to impart the fluctuation effect to the audio object can be selected. The animate flag may be configured by, based on whether the object belongs to an animate object, automatically setting a numerical value or the like from the attribute of the object or the like, or by setting a numerical value or the like individually for each audio object when generation the input data. Then, based on the numerical value or the like indicated by the animate flag included in the metadata, whether to impart the fluctuation effect to the audio object is appropriately determined by determining whether the object that corresponds to the audio object belongs to an animate object.

Also, a sound signal processing device according to a fifth aspect of the present disclosure is the sound signal processing device according to any one of the first to fourth aspects, wherein the metadata further includes a moving body flag that indicates whether the object that corresponds to the audio object is a moving body, and the selector does not select an audio object whose moving body flag indicates that the object that corresponds to the audio object is not the moving body.

With the sound signal processing device described above, depending on how the moving body flag included in the metadata is set (to, for example, which numerical value), whether to impart the fluctuation effect to the audio object can be selected. The moving body flag may be configured by, based on whether the object is a moving body, automatically setting a numerical value or the like from the attribute of the object or the like, or by setting a numerical value or the like individually for each audio object when generation the input data. Then, based on the numerical value or the like indicated by the moving body flag included in the metadata, whether to impart the fluctuation effect to the audio object is appropriately determined by determining whether the object that corresponds to the audio object is a moving body.

Also, a sound signal processing method device according to a sixth aspect of the present disclosure is a sound signal processing method for converting input data to a sound signal executed by a computer, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes position information indicating a position in the virtual sound space of the object that corresponds to the audio object, the sound signal processing method includes: selecting an audio object as a conversion target from among the one or more audio objects; and converting the audio object selected as the conversion target to impart, to the audio object selected, a fluctuation effect of fluctuating a sound emitted from an object among the one or more objects that corresponds to the audio object converted when the sound signal is reproduced, and the selecting of the audio object as the conversion target includes not selecting, as the conversion target, an audio object that corresponds to an object whose position is moving in the virtual sound space, the object being one of the one or more objects, based on a transition over time of the position information included in the metadata.

With this sound signal processing method, the same advantageous effects as those of the sound signal processing device according to the first aspect can be obtained.

Also, a sound signal processing method according to a seventh aspect of the present disclosure is a sound signal processing method for converting input data to a sound signal executed by a computer, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes orientation information indicating an orientation in the virtual sound space of the object that corresponds to the audio object, the sound signal processing method includes: selecting an audio object as a conversion target from among the one or more audio objects; and converting the audio object selected as the conversion target to impart, to the audio object selected, a fluctuation effect of fluctuating a sound emitted from an object among the one or more objects that corresponds to the audio object converted when the sound signal is reproduced, and the selecting of the audio object as the conversion target includes not selecting, as the conversion target, an audio object that corresponds to an object that is rotating in the virtual sound space, the object being one of the one or more objects, based on a transition over time of the orientation information included in the metadata.

With this sound signal processing method, the same advantageous effects as those of the sound signal processing device according to the second aspect can be obtained.

Also, a sound signal processing method according to an eighth aspect of the present disclosure is a sound signal processing method for converting input data to a sound signal executed by a computer, the input data including one or more audio objects that correspond to one or more objects located in a virtual sound space in one-to-one correspondence, wherein each of the one or more audio objects includes: sound data of a sound emitted from an object among the one or more objects that corresponds to the audio object; and metadata that includes directivity information indicating a directivity of the sound emitted from the object that corresponds to the audio object, the sound signal processing method includes: selecting an audio object as a conversion target from among the one or more audio objects; and converting the audio object selected as the conversion target to impart, to the audio object selected, a fluctuation effect of fluctuating a sound emitted from an object among the one or more objects that corresponds to the audio object converted when the sound signal is reproduced, and the selecting of the audio object as the conversion target includes not selecting, as the conversion target, an audio object that corresponds to an object whose emitting sound is omnidirectional, the object being one of the one or more objects, based on the directivity information included in the metadata.

With this sound signal processing method, the same advantageous effects as those of the sound signal processing device according to the third aspect of the present disclosure can be obtained.

Also, a recording medium according to a ninth aspect of the present disclosure is a non-transitory computer-readable recording medium having recorded thereon a program for causing a computer to execute the sound signal processing method according to any one of the sixth to eighth aspect.

With this recording medium, the same advantageous effects as those of the sound signal processing method according to any one of the sixth to eighth aspect can be obtained by using a computer.

Hereinafter, embodiments will be described specifically with reference to the drawings.

The embodiments described below show generic or specific examples of the present disclosure. The numerical values, shapes, materials, structural elements, the arrangement and connection of the structural elements, steps, the order of the steps, and the like shown in the following embodiments are merely examples, and therefore are not intended to limit the scope of the appended claims. Also, among the structural elements described in the following embodiments, structural elements not recited in any one of the independent claims are described as arbitrary structural elements. Also, the diagrams are schematic representations, and thus are not necessarily true to scale. In the diagrams, structural elements that are substantially the same are given the same reference numerals, and a redundant description may be omitted or simplified.

Embodiment 1

Overview

First, an overview of a sound signal reproduction device according to Embodiment 1 will be described. FIG. 1 is a schematic diagram showing an example of the use of the sound signal reproduction device according to Embodiment 1. FIG. 1, (a) shows user 99 who is using one of two examples of sound signal reproduction device 100, and (b) shows user 99 who is using the other one of the two examples of sound signal reproduction device 100.

Sound signal reproduction device 100 shown in FIG. 1 is used together with a display device that displays images for implementing VR/AR visual experience and a device for reproducing three-dimensional images (both devices are not shown).

Sound signal reproduction device 100 is a sound providing device that is worn on the head of user 99. Accordingly, sound signal reproduction device 100 moves together with the head of user 99 as a unitary body. For example, sound signal reproduction device 100 of the present embodiment may be a so-called over-ear headphone device as shown in (a) in FIG. 1, or may be a set of two earplug headphone devices that are independently worn in the right and left ears of user 99, respectively, as shown in (b) in FIG. 1. The two devices communicate with each other to present a sound for the right ear and a sound for the left ear in synchronization with each other.

Sound signal reproduction device 100 changes the sounds according to the movement of the head of user 99 and thereby causes user 99 to perceive as if user 99 is moving his/her head in a three-dimensional sound field. For this reason, sound signal reproduction device 100 moves the three-dimensional sound field in a direction opposite to the movement of user 99 relative to the movement of user 99.

Configuration

Figure 2:
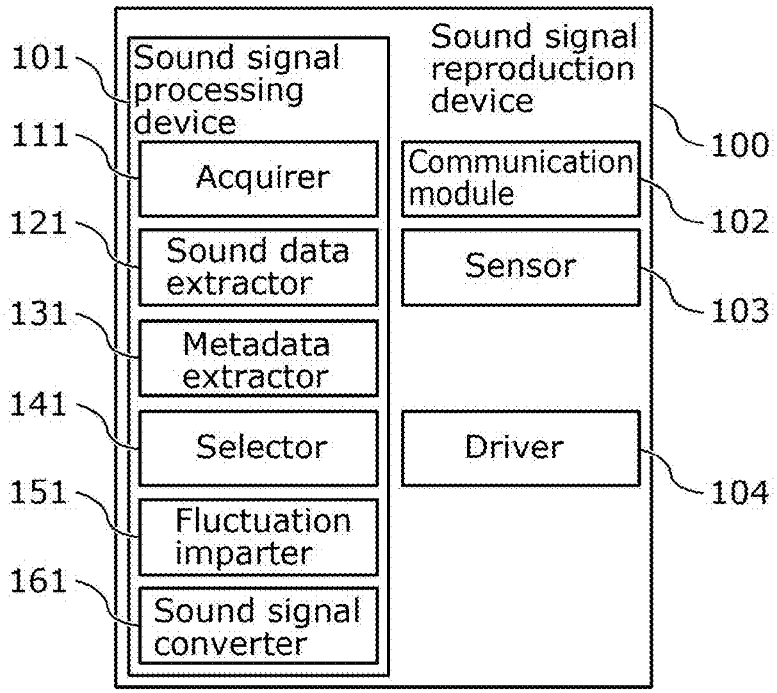
FIG. 2 is a block diagram showing a functional configuration of the sound signal reproduction device according to Embodiment 1.

Next, a configuration of sound signal reproduction device 100 according to the present embodiment will be described with reference to FIG. 2. FIG. 2 is a block diagram showing a functional configuration of the sound signal reproduction device according to Embodiment 1.

As shown in FIG. 2, sound signal reproduction device 100 according to the present embodiment includes sound signal processing device 101, communication module 102, sensor 103, and driver 104.

Sound signal processing device 101 is a computation device for performing various types of signal processing operations of sound signal reproduction device 100. Sound signal processing device 101 includes, for example, a processor and a memory, and implements various types of functions by a program stored in the memory being executed by the processor.

Sound signal processing device 101 includes acquirer 111, sound data extractor 121, metadata extractor 131, selector 141, fluctuation imparter 151, and sound signal converter 161.

Acquirer 111 is configured to be capable of performing communication with communication module 102. Communication module 102 is an interface device for receiving an input of input data that is to be input to sound signal reproduction device 100. Communication module 102 includes, for example, an antenna and a signal converter, and receives input data from an external device through wireless communication. More specifically, communication module 102 receives a wireless signal indicating input data converted into a wireless communication format by using the antenna, and re-converts the wireless signal into input data by using the signal converter. With this configuration, sound signal reproduction device 100 acquires the input data from an external device through wireless communication. The input data acquired by communication module 102 is acquired by acquirer 111. In this way, the input data is input to sound signal processing device 101. The communication between sound signal reproduction device 100 and the external device may be performed through wired communication.

The input data acquired by sound signal reproduction device 100 is coded in a predetermined format such as, for example, MPEG-I. As an example, the coded input data includes: information (sound data) regarding a sound to be reproduced by sound signal reproduction device 100; and other information (metadata) including information regarding a localization position when localizing a sound image of the sound at a predetermined position in the three-dimensional sound field (or in other words, causing the user to perceive the sound as a sound coming from a predetermined direction). The sound data and the metadata correspond to one or more audio objects included in the input data. The one or more audio objects are information for each of virtual objects located in the virtual sound space when the input data is converted to a sound signal, and the sound signal is reproduced. For this reason, a number of audio objects that is the same as the number of objects in the virtual sound space are included in the input data. Likewise, a number of sound data items that is the same as the number of objects in the virtual sound space are included in the input data. The metadata as well, a number of metadata items that is the same as the number of objects in the virtual sound space are included in the input data.

For example, sound signal processing device 101 converts the input data to a sound signal such that, when the sound signal is reproduced, sounds emitted from a plurality of objects including a first object and a second object in the virtual sound space are perceived as sounds reaching to the listening point (the position of user 99 in the virtual sound space) from directions in which the objects are located at the sound generation positions. As described above, the position and the direction of the listening point vary according to the movement of the head of user 99.

With the three-dimensional sound emitted when the sound signal is reproduced, it is possible to improve, for example, the realistic sensation of viewed content and the like together with visually recognized images provided by the display device. Only the sound data may be included in the input data. In this case, the metadata may be acquired separately. Also, as described above, the input data includes: first sound data regarding the sound emitted from the first object; and second sound data regarding the sound emitted from the second object. However, each of a plurality of input data items that separately include the first sound data and the second sound data, or in other words, each of a plurality of input data items including audio objects of the first sound data and the second sound data may be acquired and reproduced simultaneously to localize the objects at different positions in the virtual sound space. As described above, there is no particular limitation on the form of the input data that is input to sound signal reproduction device 100, and it is sufficient that acquirer 111 that support various forms of input data is provided in sound signal reproduction device 100 (in particular, sound signal processing device 101).

Acquirer 111 of the present embodiment includes, for example, an encoded sound information input receiver, a decoding processor, and a sensing information input receiver.

The encoded sound information input receiver is a processor that receives an input of coded (or in other words, encoded) input data acquired by acquirer 111. The encoded sound information input receiver outputs the input data to the decoding processor. The decoding processor uncodes (or in other words, decodes) the input data output from the encoded sound information input receiver to convert each of the one or more audio objects included in the sound information into a processable format. The sensing information input receiver will be described below together with the function of sensor 103.

Sensor 103 is a device for detecting the speed of the movement of the head of user 99. Sensor 103 is configured by combining various types of sensors used for motion detection such as a gyro sensor and an acceleration sensor. In the present embodiment, sensor 103 is included in sound signal reproduction device 100, but may be included in, for example, an external device such as a three-dimensional video reproduction device that operates according to the movement of the head of user 99 in the same manner as sound signal reproduction device 100. In this case, sensor 103 does not necessarily need to be included in sound signal reproduction device 100. Also, as sensor 103, an external image capturing device or the like may be used to capture images of the movement of the head of user 99 and process the captured images to detect the movement of the head of user 99.

Sensor 103 is fixed to, for example, the casing of sound signal reproduction device 100 to form a unitary body, and detects the speed of the movement of the casing and the amount of the movement of the casing. Sound signal reproduction device 100 including the casing moves together with the head of user 99 as a unitary body after user 99 has worn sound signal reproduction device 100, and thus as a result, sensor 103 can detect the speed of the movement of the head of user 99 and the amount of the movement of the head of user 99.

Sensor 103 may detect, for example, the angular velocity of rotation whose rotation axis is at least one of three axes that are orthogonal to each other in the virtual sound space or the acceleration of displacement whose displacement direction is at least one of the three axes, as the speed of the movement of the head of user 99.

Sensor 103 may detect, for example, the amount of rotation whose rotation axis is at least one of three axes that are orthogonal to each other in the virtual sound space or the amount of displacement whose displacement direction is at least one of the three axes, as the amount of the movement of the head of user 99.

The sensing information input receiver of acquirer 111 acquires the speed of the movement of the head of user 99 and the amount of the movement of the head of user 99 from sensor 103. More specifically, the sensing information input receiver acquires the amount of the movement of the head of user 99 detected by sensor 103 per unit time as the speed of the movement of the head of user 99. In this way, the sensing information input receiver acquires at least any one of rotation speed, rotation amount, displacement speed, and displacement amount as the result of sensing from sensor 103. The amount of the movement of the head of user 99 acquired here is used to determine the coordinates and the orientation of user 99 (the position and the direction of the listening point) in the virtual sound space. In sound signal reproduction device 100, the relative position of each object is determined based on the coordinates and the orientation of user 99 that were determined, and then the sound is reproduced. To put it differently, in sound signal reproduction device 100, for each of object positions of objects located at predetermined positions in the virtual sound space, the relative position and direction of the listening point are determined, and then the sound is reproduced.

Sound data extractor 121 is a processor that, for each of the one or more audio objects acquired by decoding the input data, extracts sound data of a sound emitted from the corresponding object from among audio objects as a data set. The sound data includes information regarding the frequency and the intensity of the sound emitted from the object. Sound data extractor 121 outputs the extracted sound data to sound signal converter 161. The function of sound signal converter 161 will be described later.

Metadata extractor 131 is a processor that, for each of the one or more audio objects acquired by decoding the input data, extracts metadata including the position information of the corresponding object from among audio objects as a data set. The metadata includes, in addition to the position information of the corresponding object, orientation information regarding the orientation of the object, directivity information regarding the directivity of the sound emitted from the object, an animate flag indicating whether the object belongs to an animate object, a moving body flag indicating whether the object is a moving body, and the like.

The metadata is used in processing of determining how a sound emitted from an object that corresponds to an audio object that includes the metadata is generated in the virtual sound space: from which position, in which direction, and at which directivity (characteristics regarding, for each direction from the sound generation position, at which intensity the sound is generated) the sound is generated. For this reason, metadata extractor 131 outputs the extracted metadata to sound signal converter 161.

Also, in the present embodiment, an audio object to which the fluctuation effect is to be imparted is selected by using the information included in the metadata. This selection processing is performed by selector 141. For this reason, metadata extractor 131 also outputs the extracted metadata to selector 141.

Selector 141 is a processor that selects an audio object as a conversion target (or in other words, an audio object to be subjected to conversion to impart the fluctuation effect) from among the one or more audio objects. Selector 141 makes the above-described determination based on the metadata output from the metadata extractor. Specifically, selector 141 determines, based on the position information of the object included in the metadata, whether the object is moving. If it is determined that the object is stationary, the audio object is selected as a conversion target to which the fluctuation effect is to be imparted. To put it differently, if it is determined that the object is moving, the fluctuation effect is not imparted to the audio object that corresponds to the object.

Here, the fluctuation effect will be described. As described above, the fluctuation effect is signal processing for fluctuating a sound emitted from an object in a time domain when the sound signal is reproduced. The expression "a sound is fluctuated" used herein means that the position of the object that emits the sound changes in the time domain (position fluctuation), that the orientation of the object that emits the sound changes in the time domain (angle fluctuation), that the directivity of the object that emits the sound changes in the time domain (directivity fluctuation), and the like. In the present embodiment, any one or more of the fluctuations described above may be selected and used, and there is no particular limitation on the type of fluctuation and the combination thereof. For the sound fluctuations described above, signal processing is performed to fluctuate the sound within a small range such that the fluctuations do not cause user 99 to feel uncomfortable. For this reason, if the object moves or rotates beyond the fluctuation range, or if the object has no directivity (the object is omnidirectional), even when the fluctuation effect is imparted, the advantageous effect is cancelled out.

Selector 141 determines that the object is moving only when the position of the object changes to cancel out the imparted fluctuation effect, or in other words, only when the position of the object changes beyond the fluctuation range. For example, when an object is moving beyond the average walking speed of a human, selector 141 determines that the object is moving so as not to impart the fluctuation effect. At this time, even when an object is moving at a speed less than or equal to the average walking speed of a human, selector 141 determines that the object is not moving (or in other words, the object is stationary). Accordingly, the term "stationary" used herein means being substantially not moving including a movement at a certain speed or less.

Selector 141 determines, based on the transition over time of the position information, whether the object is moving. Selector 141 selects only an audio object that corresponds to the object for which it has been determined as stationary. However, when the object that corresponds to the audio object is an inanimate object or a non-moving body, imparting the fluctuation effect actually causes the user to feel uncomfortable, and thus selector 141 is configured not to select the object that is an inanimate object or a non-moving body. Specifically, the metadata includes an animate flag and a moving body flag, and selector 141 selects an audio object that indicates that the animate flag is true, or in other words, the audio object belongs to an animate object and the moving body flag is true, or in other words, the audio object is a moving body. The determination that uses the animate flag and the moving body flag is not a requirement. Selector 141 may determine the audio object selection based only on the movement of the object.

The information indicating that the audio object has been selected is associated with ID information for identifying the audio object or the like, and output to fluctuation imparter 151. The information indicating that the audio object has not been selected does not necessarily need to be output, and may be associated with ID information for identifying the audio object or the like, and output to fluctuation imparter 151 in the same manner as described above.

Fluctuation imparter 151 is a processor that performs conversion to impart the fluctuation effect on the audio object selected by selector 141. The fluctuation effect is imparted by, for example, performing conversion to change the data included in the metadata over time. In this example, the metadata that has been subjected to conversion is output to sound signal converter 161, and by updating the metadata output from metadata extractor 131, processing is performed by sound signal converter 161 in accordance with the metadata that has undergone conversion.

Sound signal converter 161 performs processing to generate, based on the sound data and the metadata, a sound emitted from an object corresponding to each audio object at a position, a direction and a directivity in the virtual sound space, the position, the direction, and the directivity being included in the information included in the metadata. Sound signal converter 161 performs conversion processing of converting the sound data and the metadata to a sound signal that is an analog signal, and outputs the sound signal obtained after conversion. An audio object selected by selector 141 is an audio object to which the fluctuation effect is to be imparted by fluctuation imparter 151. For example, in the example in which the metadata is converted, the metadata has been updated along with the changes in the position, the direction, and the directivity over time. Accordingly, by performing processing such that the sound is generated at the position, the direction, and the directivity included in the information included in the updated metadata, the sound signal is generated such that the sound reaches the listening point as if fluctuating.

Also, in the generation of the sound signal, sound signal converter 161, by using the coordinates and the orientation of user 99 (the position and the direction of the listening point) in the virtual sound space obtained through information processing via sensor 103 and the like, convolves various types of head-related transfer functions such that the sound reaches the listening point from the position of each object, thereby generating the sound signal that can reproduce the sound that reaches the listening point from each of object positions of objects located at predetermined positions in the virtual sound space.

Then, sound signal converter 161 outputs the generated sound signal to driver 104. Sound signal converter 161 causes driver 104 to generate a sound wave based on a waveform signal indicated by the sound signal, and presents the sound to user 99. Driver 104 includes: for example, a diaphragm; and a driving mechanism that includes a magnet, a voice coil, and the like. Driver 104 operates the driving mechanism according to the waveform signal to cause the driving mechanism to vibrate the diaphragm. In this way, with the vibration of the diaphragm according to the sound signal, driver 104 generates a sound wave. The sound wave propagates through the air and reaches the ears of user 99, and user 99 perceives the sound.

Operation

Figure 3:
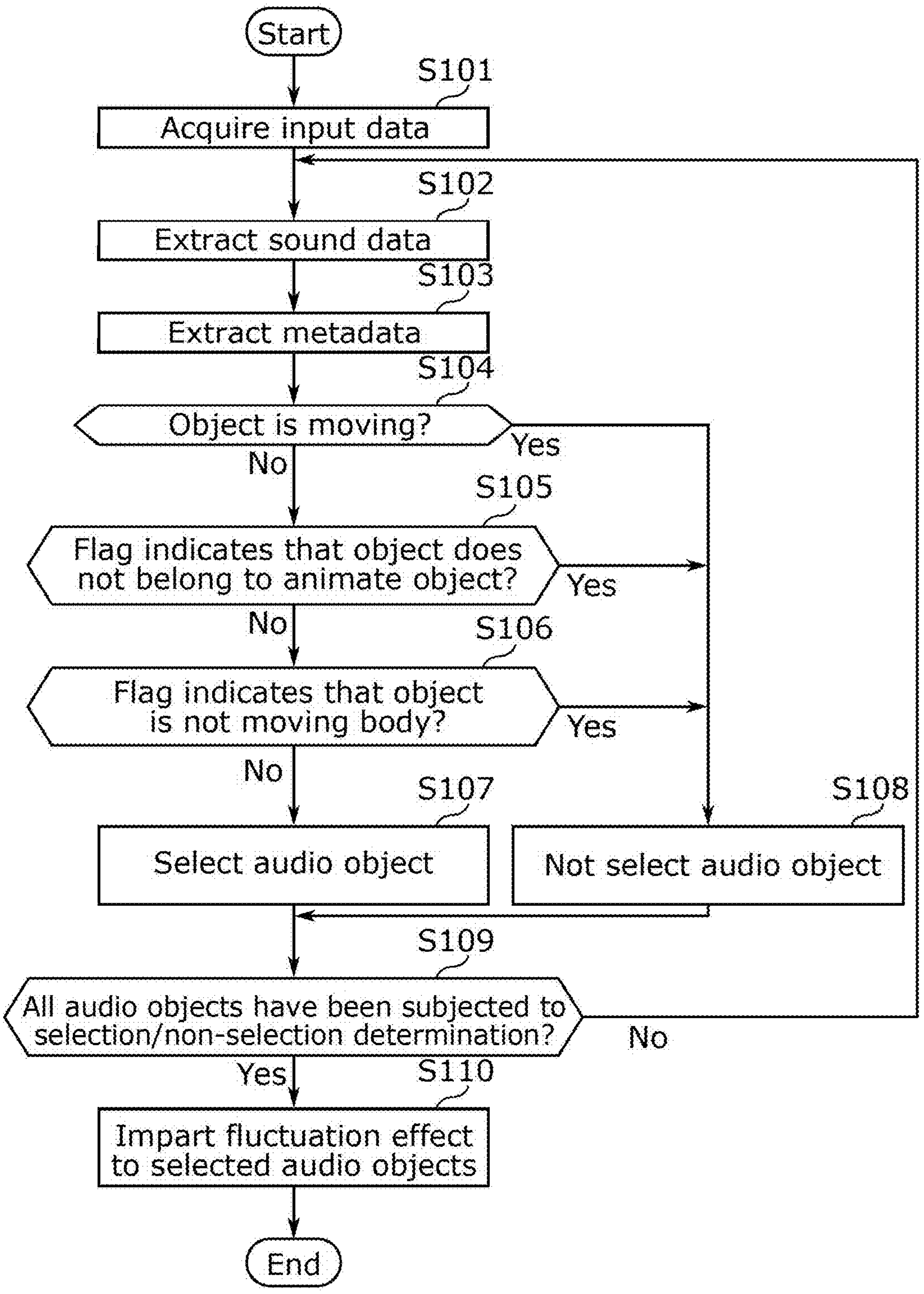
FIG. 3 is a flowchart illustrating an operation performed by a sound signal processing device according to Embodiment 1.

Next, an operation performed by sound signal reproduction device 100 and sound signal processing device 101 described above will be described with reference to FIG. 3. FIG. 3 is a flowchart illustrating an operation of the sound signal processing device according to Embodiment 1. First, when the operation of sound signal reproduction device 100 starts, acquirer 111 acquires input data via communication module 102 (S101). The input data is decoded, and one or more audio objects are extracted. Next, sound data extractor 121 extracts sound data from each of the one or more audio objects (S102). The extracted sound data is output to sound signal converter 161. On the other hand, metadata extractor 131 extracts metadata from the audio object (S103). The extracted metadata is output to selector 141 and sound signal converter 161.

Selector 141 first determines, based on the transition over time of the position information included in the metadata, whether the object is moving (S104). If it is determined that the object is not moving, or in other words, the object is stationary (No in S104), selector 141 further determines, based on the animate flag, whether the animate flag indicates that the object does not belong to an animate object (S105). If it is determined that the animate flag does not indicate that the object does not belong to an animate object, or in other words, the object belongs to an animate object (No in S105), selector 141 further determines, based on the moving body flag, whether the moving body flag indicates that the object is not a moving body (S106). If it is determined that the moving body flag does not indicate that the object is not a moving body, or in other words, the object is a moving body (No in S106), selector 141 selects the audio object (S107). On the other hand, if it is determined that the object is moving (Yes in S104), if it is determined that the object does not belong to an animate object (the object is an inanimate object) (Yes in S105), or if it is determined that the object is not a moving body (the object is a non-moving body) (Yes in S106), selector 141 does not select the audio object (S108).

After that, it is determined whether all audio objects have been subjected to selection/non-selection determination (S109). If it is determined that not all audio objects have been subjected to selection/non-selection determination (No in S109), the same processing is repeated from step S102 for the next audio object.

If it is determined that all audio objects have been subjected to selection/non-selection determination (Yes in S109), fluctuation imparter 151 imparts the fluctuation effect to the selected audio objects (S110). Fluctuation imparter 151 does not impart the fluctuation effect to non-selected audio objects.

Then, sound signal converter 161 converts the metadata into a sound signal and outputs the sound signal to driver 104, and a sound in which the fluctuation effect has been imparted only to necessary audio objects is reproduced.

In the manner as described above, it is possible to implement a sound signal processing device, wherein, by selectively separating various types of objects located in the virtual sound space into an object to which the fluctuation effect is to be imparted (conversion target) and an object to which the fluctuation effect is not to be imparted (non-conversion target) to distinguish therebetween, the sense of realism and the sense of localization of only necessary objects can be improved, while objects that have little benefit from imparting the fluctuation effect are not processed to suppress expansion of the processing resources, thereby causing the user to more appropriately perceive a three-dimensional sound in terms of processing efficiency.

Embodiment 1 of the present disclosure is configured such that, when the object is moving or the object is rotating, the fluctuation component is not imparted to the object. However, in the following case, it is effective to impart the fluctuation effect even when the object is moving or the object is rotating. Specifically, by imparting, to a linearly moving object, a fluctuation or a fluctuation of rotation in a direction that is not the moving direction of the object, or by shifting a rotating object at the localized position forward and backward, left and right, or up and down, the advantageous effects of the present application can be exhibited. Accordingly, in the case where the relationship between the object and the type of fluctuation satisfies the above-described specific case, an audio object that corresponds to the object is selected as a conversion target. For example, after yes is determined in step S104 shown in FIG. 3, a determination is made as to whether the audio object applies to the above case. If it is determined that the audio object applies to the above case, the processing proceeds to step S105. On the other hand, if it is determined that the audio object does not apply to the above case, the processing proceeds to step S108.

Embodiment 2

Next, a sound signal reproduction device according to Embodiment 2 will be described. Hereinafter, Embodiment 2 will be described focusing on differences from Embodiment 1, and a description of corresponding structural elements and structural elements that are substantially the same will be omitted. In Embodiment 2 described below, the processing operations are the same except for the operation of selector 141. Accordingly, sound signal reproduction device 100 shown in FIG. 2 can also be regarded as the sound signal reproduction device according to Embodiment 2.

Figure 4:
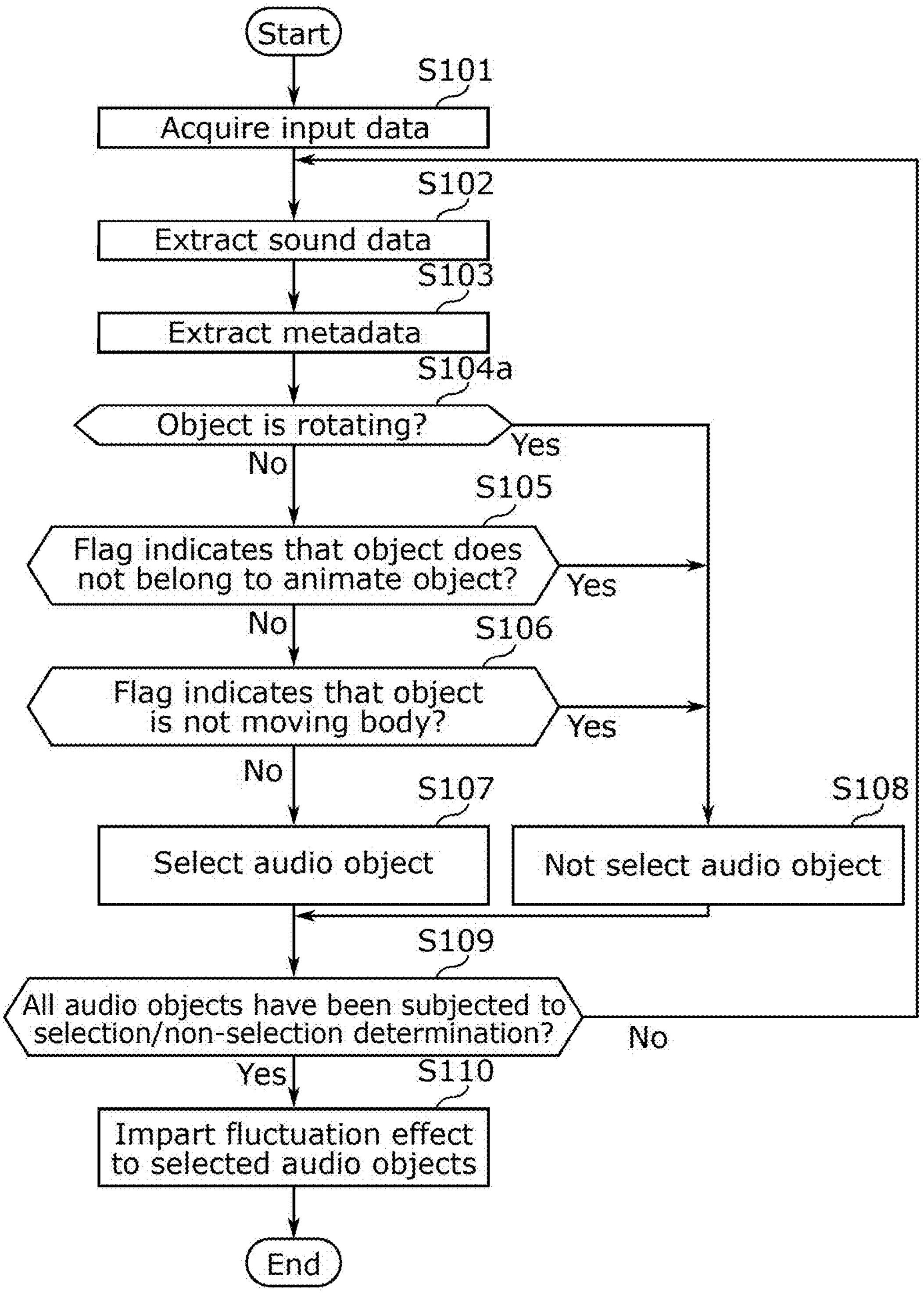
FIG. 4 is a flowchart illustrating an operation performed by a sound signal processing device according to Embodiment 2.

FIG. 4 is a flowchart illustrating an operation of the sound signal processing device according to Embodiment 2. As shown in FIG. 4, in the sound signal processing device according to Embodiment 2, step S104*a* is performed instead of step S104 performed by sound signal processing device 101 of Embodiment 1.

In Embodiment 2, selector 141 determines, by using the orientation information of the object included in the metadata, whether the object is rotating. If it is determined that the object is not rotating, selector 141 selects the audio object as a conversion target for imparting the fluctuation effect. To put it differently, if it is determined that the object is rotating, the fluctuation effect is not imparted to the audio object that corresponds to the object.

Selector 141 determines that the object is rotating only for an object (rotating object) whose orientation changes to cancel out the imparted fluctuation effect, or in other words, an object whose orientation changes beyond the fluctuation range. For example, when the orientation of the object changes beyond a threshold value such as 5 degrees, 10 degrees, 15 degrees, 45 degrees, 60 degrees, 90 degrees, or 180 degrees within a predetermined period of time, selector 141 determines that the object is rotating so as not to impart the fluctuation effect. At this time, selector 141 determines that the object is not rotating (or in other words, the object has no rotation) even when the orientation of the object changes below the threshold value. Accordingly, the expression "not rotating" used herein means having substantially no rotation including a change in the orientation less than or equal to the threshold value.

In step S104*a*, selector 141 first determines, based on the transition over time of the orientation information included in the metadata, whether the object is rotating. If it is determined that the object is not rotating, or in other words, the object has no rotation (No in S104*a*), the processing proceeds to step S105. On the other hand, if it is determined that the object is rotating (Yes in S104*a*), the processing proceeds to step S108. The processing operations after that are performed in the same manner as in Embodiment 1.

Embodiment 3

Next, a sound signal reproduction device according to Embodiment 3 will be described. Hereinafter, Embodiment 3 will be described focusing on differences from Embodiment 1, and a description of corresponding structural elements and structural elements that are substantially the same will be omitted. In Embodiment 3 described below, the processing operations are the same except for the operation of selector 141. Accordingly, sound signal reproduction device 100 shown in FIG. 2 can also be regarded as the sound signal reproduction device according to Embodiment 3.

Figure 5:
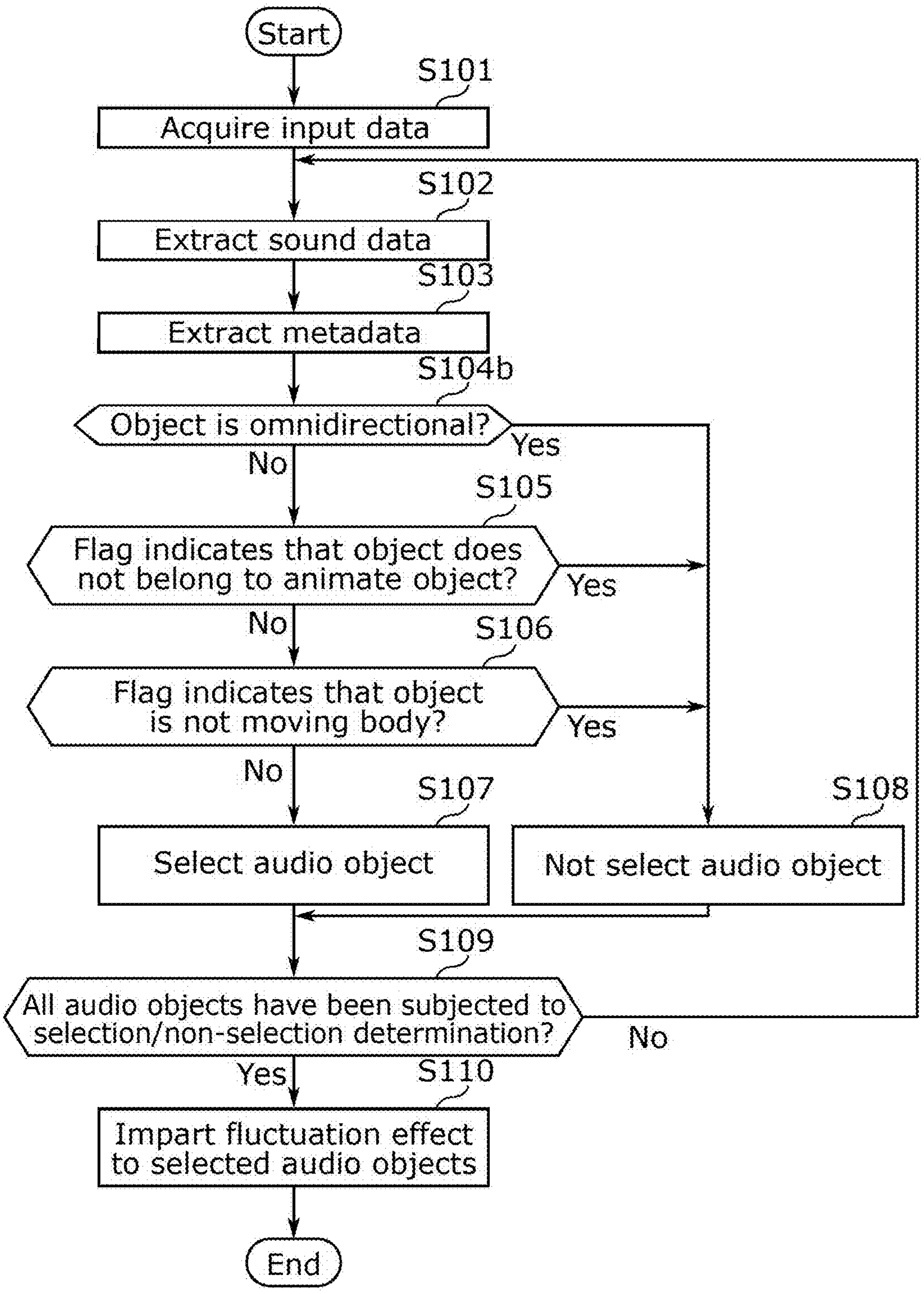
FIG. 5 is a flowchart illustrating an operation performed by the sound signal processing device according to Embodiment 2.

FIG. 5 is a flowchart illustrating an operation of the sound signal processing device according to Embodiment 3. As shown in FIG. 5, in the sound signal processing device according to Embodiment 3, step S104*b* is performed instead of step S104 performed by sound signal processing device 101 of Embodiment 1.

In Embodiment 3, selector 141 determines, by using the directivity information of the object included in the metadata, whether the object is omnidirectional. If it is determined that the object is not omnidirectional, selector 141 selects the audio object as a conversion target for imparting the fluctuation effect. To put it differently, if it is determined that the object is omnidirectional, the fluctuation effect is not imparted to the audio object that corresponds to the object.

Selector 141 determines that the object is omnidirectional only for an object whose directivity does not have steepness that cancels out the imparted fluctuation effect, or in other words, in which a change in the fluctuation range cannot be perceived. For example, when the directivity has steepness whose change cannot be perceived based on human's auditory resolution, selector 141 determines that the object is omnidirectional so as not to impart the fluctuation effect. At this time, even when the directivity of the object has steepness at a level less than or equal to a level at which a change cannot be perceived based on human's auditory resolution, selector 141 determines that the object does not have directivity (or in other words, the object is omnidirectional). Accordingly, the expression "not have directivity" used herein means being substantially omnidirectional including having directivity whose steepness is at a level less than or equal to a level at which a change cannot be perceived based on human's auditory resolution.

In step S104*b*, selector 141 first determines, based on the directivity information included in the metadata, whether the object is omnidirectional. If it is determined that the object is not omnidirectional, or in other words, the object has directivity (No in S104*b*), the processing proceeds to step S105. On the other hand, if it is determined that the object is omnidirectional (Yes in S104*b*), the processing proceeds to step S108. The processing operations after that are performed in the same manner as in Embodiment 1. Whether to impart the fluctuation effect, or in other words, the audio object selection/non-selection may be determined based on a plurality of conditions by combining two or more of Embodiments 1 to 3.

Other Embodiments

The embodiments of the present disclosure have been described above, but the present disclosure is not limited to the embodiments given above.

For example, in the embodiments given above, an example was described in which the sound does not follow the movement of the head of the user. However, the content of the present disclosure is also effective in the case where the sound follows the movement of the head of the user. Specifically, the sense of realism and the sense of localization of an object that emits a predetermined sound may be improved by, during a operation of causing the user to perceive the predetermined sound as a sound reaching from a first position that relatively moves together with the movement of the head of the user, determining, based on the metadata, whether the predetermined sound is to be fluctuated.

Also, for example, the sound signal reproduction device described in the embodiments given above may be implemented as a single device that includes all structural elements, or may be implemented by assigning each function to a plurality of devices and causing the plurality of devices to work in cooperation. In the case of the latter, an information processing device such as a smartphone, a tablet terminal, or a PC may be used as a device that corresponds to a processing module.

Also, the sound signal reproduction device according to the present disclosure may also be implemented as a sound signal processing device that is connected to a reproduction device composed only of a driver, and only outputs a sound signal to the reproduction device based on acquired input data. In this case, the sound signal processing device may be implemented as hardware that includes a dedicated circuit or software for causing a general-purpose processor to execute specific processing.

Also, in the embodiments given above, the processing executed by a specific processor may be executed by a different processor. Also, the order of execution of a plurality of processing operations may be changed, or a plurality of processing operations may be executed in parallel.

Also, in the embodiments given above, the structural elements may be implemented by executing a software program suitable for the structural elements. The structural elements may be implemented by a program executor such as a CPU or a processor reading and executing a software program recorded in a recording medium such as a hard disk or a semiconductor memory.

Also, the structural elements may be implemented by using hardware. For example, the structural elements may be circuits (or an integrated circuit). The circuits may constitute a single circuit as a whole, or may be separate circuits. Also, the circuits may be general-purpose circuits or dedicated circuits.

Also, general and specific aspects of the present disclosure may be implemented using an apparatus, a device, a method, an integrated circuit, a computer program, or a computer-readable recording medium such as a CD-ROM. Also, the general and specific aspects of the present disclosure may also be implemented by any combination of an apparatus, a device, a method, an integrated circuit, a computer program, and a recording medium.

For example, the present disclosure may be implemented as a sound signal processing method executed by a computer, or a program for causing a computer to execute the sound signal processing method. The present disclosure may be implemented as a computer-readable non-transitory recording medium in which the program is recorded.

The present disclosure also encompasses other embodiments obtained by making various modifications that can be conceived by a person having ordinary skill in the art to the above embodiments as well as embodiments implemented by any combination of the structural elements and the functions of the above embodiments without departing from the scope of the present invention.

INDUSTRIAL APPLICABILITY

With the present disclosure, the sound signal processing device according to the present invention is useful in sound processing of an AR or VR device, or the like in terms of improving the sense of realism and the sense of localization of an object located in a virtual sound space while suppressing expansion of processing resources more than necessary.

The invention claimed is:

1. A sound signal processing device that converts input data to a sound signal, the input data including one or more audio objects that correspond to one or more objects located in a virtual sound space in one-to-one correspondence, wherein each of the one or more audio objects includes:

sound data of a sound emitted from an object among the one or more objects that corresponds to the audio object; and metadata that includes information of the object that corresponds to the audio object, the sound signal processing device comprises:

a selector that selects an audio object as a conversion target from among the one or more audio objects; and a fluctuation imparter that converts the audio object selected as the conversion target to impart, to the audio object selected, a fluctuation effect of fluctuating a sound emitted from an object among the one or more objects that corresponds to the audio object converted when the sound signal is reproduced, and the selector does not select, as the conversion target, an audio object that corresponds to at least one of: the object whose position is moving in the virtual sound space; the object that is rotating in the virtual sound space; or the object whose emitting sound is omnidirectional, the object being one of the one or more objects, based on the information included in the metadata.

2. The sound signal processing device according to claim 1, wherein the metadata further includes an animate flag that indicates whether the object that corresponds to the audio object belongs to an animate object, and the selector does not select an audio object whose animate flag indicates that the object that corresponds to the audio object does not belong to the animate object.

3. The sound signal processing device according to claim 1, wherein the metadata further includes a moving body flag that indicates whether the object that corresponds to the audio object is a moving body, and the selector does not select an audio object whose moving body flag indicates that the object that corresponds to the audio object is not the moving body.

4. A sound signal processing method for converting input data to a sound signal executed by a computer, the input data including one or more audio objects that correspond to one or more objects located in a virtual sound space in one-to-one correspondence, wherein each of the one or more audio objects includes:

sound data of a sound emitted from an object among the one or more objects that corresponds to the audio object; and metadata that includes information of the object that corresponds to the audio object, the sound signal processing method comprises:

selecting an audio object as a conversion target from among the one or more audio objects; and converting the audio object selected as the conversion target to impart, to the audio object selected, a fluctuation effect of fluctuating a sound emitted from an object among the one or more objects that corresponds to the audio object converted when the sound signal is reproduced, and the selecting of the audio object as the conversion target includes not selecting, as the conversion target, an audio object that corresponds to at least one of: the object whose position is moving in the virtual sound space; the object that is rotating in the virtual sound space; or the object whose emitting sound is omnidirectional, the object being one of the one or more objects, based on the information included in the metadata.

5. A non-transitory computer-readable recording medium having recorded thereon a program for causing a computer to execute the sound signal processing method according to claim 4.

* * * * *